106. COMPOSITIONS, COATING OR PLASTIC
84
SUBSTITUTED FOR MISSING COPY.
EXAMINER
77,705

UNITED STATES PATENT OFFICE.

ANTONIO PELLETIER, OF WASHINGTON, DISTRICT OF COLUMBIA.

IMPROVED CEMENT FOR ROOFING, ARTIFICIAL STONE, COATING IRON, WOOD, &c.

Specification forming part of Letters Patent No. 77,705, dated May 5, 1868.

To all whom it may concern:

Be it known that I, ANTONIO PELLETIER, of Washington, in the county of Washington, District of Columbia, have invented certain new and useful Improvements in Cement for Roofing, Artificial Stone, Coating Iron, Wood, &c.; and I do hereby declare that the following is a full, clear, and exact description thereof.

To enable others skilled in the art to construct and use my invention, I will proceed to describe it.

My invention relates to improvements in the composition of matter, for which Letters Patent Nos. 63,087, 71,210, 73,643, 74,587, and 76,806 were granted to me; and consist, principally, in the use and preparation of fire and water proof cement for roofing and other purposes.

While the composition for which my other patents were granted answers well for many purposes, I have found by further experiments that it could be materially improved. My composition, as now made, I find makes perfectly fire and water proof coats upon wood and other perishable materials.

In making my composition I prepare insoluble oxychloride by treating any separable soluble or insoluble oxide with the corresponding soluble chloride. Thus I mix, for instance, oxide of calcium with chloride of calcium; oxide of magnesium with chloride of magnesium; oxide of aluminum with chloride of aluminum, &c. But I prefer, for my purposes, to all others the oxychlorides of the heavy metals—for instance, oxide of zinc (or its roasted ores) when treated with chloride of zinc, or oxide of iron (or powdered hematite, ocher, Venetian red, umber) with chloride of iron or oxide of manganese, &c.; or I use mixtures of all or several of these oxides and chlorides.

In my experiments I have established that, during the formation of these insoluble oxychlorides, organic substances of a vegetable or animal nature (such as vegetable or animal fiber, hair, wool, shoddy, and torn-up rags) can be not only firmly embedded by them, but are by the antiseptic properties of the chlorides and oxychlorides completely protected from putrefaction and decay.

The addition of granulated or powdered mineral ingredients, such as mica, sand, soap-stone, slate-powder, asbestus, or slags, or any other pounded minerals and rocks, serve not only as a binding material, but lends to the whole a stone-like appearance.

Indeed, the cement mass, when prepared as above stated, out of oxychlorides, vegetable and mineral matter, and pulverized mineral constituents, forms artificial stone, which may be made variegated by mineral colors and of glass-like smoothness by coating it with a thin layer of silicate of soda.

The composition adheres not only firmly to the wood, but is as perfectly fire and water proof as any mineral mass in nature, and, owing to the highly antiseptic qualities of the mixture, it preserves wooden vessels of all descriptions, roofs, and the bottom of ships, when coated with it. Although the wood underneath it may shrink, yet the cement layer will not crack or separate therefrom.

This cement mass, mixed with some glue or gelatine, forms a hard polishable mass, suitable for table-plates or casts of various kinds, which when dry may be finally coated with silicate of soda, or silicate of soda charged with mineral colors.

Although I do not limit my claims to any particular proportion, but vary them as desired, still the following example will illustrate some of the quantities of materials I employ in preparing my cement: Eight parts, by weight, of moist woody fiber, or hair; four parts, by weight, of sand, asbestus, or mica, or mixtures of them; four parts, by weight, of oxide of zinc. The whole, after being powdered and well mixed, is stirred with chloride-of-zinc solution of 30° to 35° Baume, to render the whole plastic; or I take twenty parts, by weight, of vegetable pulp, nearly dry, hair, or rags; twenty-two parts, by weight, of oxide of zinc; ten parts, by weight, of mica or micaceous minerals; twenty-three parts, by weight, of asbestus, or other fibrous minerals, gypsum, &c.; twenty-five parts, by weight, of sand or pounded rock of any description. The powdered mixture is then formed into a plastic cement by the addition of a sufficient quantity of chloride of zinc 30° to 35° Baumé.

Instead of the oxide of zinc and chloride of zinc, I employ other oxides and corresponding chlorides of the alkaline earths, true earths, or the heavy metals, in any suitable proportions, or I employ mixtures of different oxides and chlorides—for instance, oxide of iron and oxide of zinc to be treated after the admixture of mineral matters with the chlorides of zinc and of iron, all in suitable proportions.

The cement thus formed soon turns hard, and may, if desired, be embellished by a coat of silicate of soda, or of silicate of soda ground together with mineral paints of any color.

I find that for many coatings a chloride-of-zinc solution of 30° Baumé will answer for producing a plastic hardening mass; but for covering large roofs it is necessary, for the sake of uniformity, to prevent a too rapid solidification, i. e., to prevent the cement composition for a whole day, or even longer, from getting hard. To accomplish this end, I moisten the mass with, or stir into it, a solution of gelatine, glue, starch, gum, dextrine, sugar, borax, sulphate of ammonia, or other equivalent hygroscopic substances. I employ, for instance, for every two hundred and twenty-five pounds of the composition, potato water, which contains from one to two dozen potatoes boiled to pieces. Chloride-of-zinc solution, used last to impart to the cement composition a proper consistency, ought to have in this case a strength of 47° to 55° Baumé.

Having thus described my invention, what I claim is—

1. The chlorides of the alkaline earths, true earths, and heavy metals, in combination with the corresponding oxides of these, for the purpose of producing insoluble oxychloride compounds, substantially as described and set forth.

2. In combination with the oxides and chlorides, organic substances, such as vegetable and animal fiber, glue, hair, shoddy, substantially as described and set forth.

3. In combination with oxychlorides and organic substances, finely-divided granulated fibrous or pulverized mineral ingredients of any kind, substantially as set forth.

4. The above-mentioned composition, with or without the incorporation or external coating with silicate of soda, either by itself or ground together with mineral colors, substantially as described and set forth.

5. In combination with the cement composition for preventing its too rapid solidification, solutions of starch, gum, dextrine, sugar, gelatine, borax, or sulphate of ammonia, substantially as described and set forth.

ANTONIO PELLETIER.

Witnesses:
H. M. RIGSBY,
ABIA L. SMITH.